March 28, 1944.                J. G. BOOTH ET AL                    2,345,175
                            TEMPERATURE RESPONSIVE DEVICE
                                Filed Jan. 18, 1941
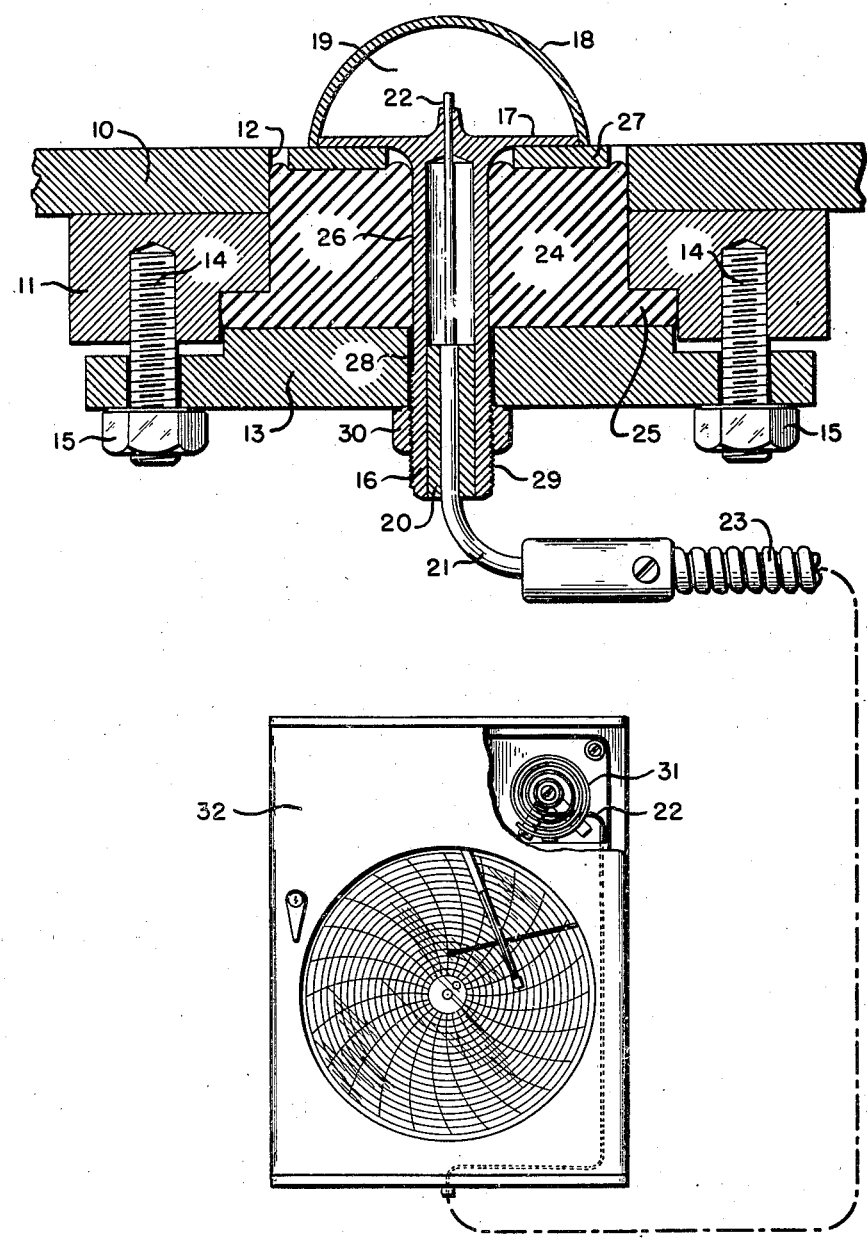
                                                    INVENTOR.
                                                JOHN G. BOOTH
                                    BY          LOUIS GESS
                                                G. B. Spangenberg
                                                        ATTORNEY Patented Mar. 28, 1944

2,345,175

UNITED STATES PATENT OFFICE 2,345,175

TEMPERATURE RESPONSIVE DEVICE

John G. Booth, Philadelphia, and Louis Gess, Jenkintown, Pa., assignors to The Brown Instrument Company, Philadelphia, Pa., a corporation of Pennsylvania Application January 18, 1941, Serial No. 374,932

6 Claims. (Cl. 297—3)

This invention relates to improvements in thermo-sensitive devices and more particularly to thermometer bulbs.

It is an object of the invention to provide a thermosensitive element having a large non-impeding surface so that the element will respond quickly to temperature changes.

It is also an object of the invention to provide a streamlined thermometer bulb which is practically unaffected by flowing fluid. The bulb of this invention is designed to minimize the torques produced by fluid flow which would bend or break other types of bulbs, and further, is designed to present a strong surface which will not easily be broken when hit by heavy particles that might be suspended in a fluid. The streamlines of a thermometer bulb of this type have an accompanying advantage in that the flow of fluid is substantially unimpeded by the bulb.

A further object of this invention is to minimize errors generally introduced in a measuring system of the type using a thermometer bulb due to the conduction of heat between the bulb and the container, or pipe in which the bulb is mounted.

Another object of the invention is to provide means for resiliently mounting an element so that shocks resulting from heavy particles striking the element will be absorbed to an extent sufficient to prevent breakage of the element.

The various features of novelty which characterize this invention are pointed out with particularity in the claims annexed to and forming a part of this specification. For a better understanding of the invention, however, its advantages and the specific objects obtained with its use, reference should be had to the accompanying drawing and descriptive matter in which is illustrated and described a preferred embodiment of the invention.

The drawing illustrates a sectional plan view of the thermo-sensitive device of this invention associated with a measuring instrument.

Referring to the drawing, the reference numeral 10 indicates a wall. This wall 10 might be that of a tank or vat containing fluid, the temperature of which it is desired to measure, or wall 10 may be the side of a pipe through which said fluid is flowing. For the purpose of mounting a thermometer bulb in such a wall a reinforcement member 11 may be affixed to the wall 10 in some suitable manner, such as by welding, so that a smooth hole 12 of substantial depth may be formed. A cap or cover plate 13 may be used to cover the hole 12, hold the thermo-sensitive element in place, and provide means to adjust the positional relation of the thermo-sensitive element in the aperture. For illustration, threaded studs 14 secured in the reinforcement member 11 are shown adapted to pass through holes in plates 13 and nuts 15 cooperating with the threaded studs provide adjustable means to hold the cover plate 13 in place, it is obvious, however, that any other means to accomplish this end may be used.

The thermo-sensitive element of this invention is illustrated as having a shank 16 and a flanged end 17. A hemispherical wall 18 is fastened to the flange 17 by welding, or other suitable process, so as to form a chamber 19. The wall 18 extends into the tank or vat and is contacted by the fluid therein. The chamber 19 contains a thermoresponsive fluid which will change in pressure in response to changes in temperature of the wall 18 and hence the fluid in the tank or vat. Since the hemispherical wall 18 provides an extremely large area subject to the temperature of the fluid in the tank or vat, the device is very sensitive. An entry plug 20 and a protecting tube 21 secured to the shank 16 and to each other, as by soldering, provide conventional means to introduce a capillary tube 22 through the shank 16 into direct communication with the chamber 19. The capillary tube 22 is illustrated as providing means for communicating pressure changes in chamber 19 with a spiral Bourdon tube 31 or its equivalent structure in a remote indicating, recording or controlling instrument 32. It should be understood, however, that the means for indicating, recording and/or controlling form no part of the present invention and any other suitable type may be used. An armoured cable 23 may be provided to protect the capillary tube 22 from being crushed, or bent through too small an angle.

For the purpose of mounting the thermo-sensitive element a resilient material 24 is provided. This material makes it possible to prevent leakage of fluid from the container and further provides insulating means to reduce the conduction of heat between the wall 10 of the container and the thermo-sensitive element. The shock-absorbing qualities of such resilient materials have the further advantage of helping to prevent breakage of the bulb such as might result if the bulb were struck by heavy particles. While the actual design of the resilient material 24 is not important, it may constitute a single member, as illustrated, and have a flange 25 adapted to be received by a cut-out portion in the reinforcement member 11 so as to provide more rigid support and a more positive fluid tight construction. The resilient member contains a hole 26 large enough for the shank 16 to pass through. A protective member which may comprise a rigid member 27 having a hole substantially larger than the hole 26 is adapted to lie between the flange 17 and the resilient material. This rigid member 27 keeps the resilient material from entering the container and by making the rigid member smaller in its outside dimensions than those of the hole 12 the heat insulating qualities of such resilient materials, as might be used, prevents direct conduction of heat between the thermo-sensitive element and its support. A further advantage of the rigid member 27 exists in that the resilient material is somewhat protected from any chemical action of the material whose temperature is being measured. The previously mentioned cover plate 13 has a hole 28 large enough for the shank 16 of the thermo-sensitive element to easily pass through and said shank 16 is threaded at 29 to receive a jam nut 30.

In mounting, the rigid member 27, the resilient member 24, plate 13, and jam nut 30 are placed on shank 16 in the order named. The jam nut is then tightened sufficiently to hold the parts in place so that they may be aligned. After the rigid member 27 is properly centered the assembly is inserted in the hole 12, nuts 15 are loosely placed on the studs 14 with just sufficient tension exerted by them to hold the plate 13 in place. Jam nut 30 is then tightened so as to draw the shank of the thermo-sensitive element through plate 13 which action presses the resilient material against the sides of hole 12, and squeezes the material into fluid tight relation with all the surfaces it contacts. After jam nut 30 has been tightened the means for fastening cover plate 13, in this instance the nuts 15, are drawn up as desired.

In order to eliminate the catching of particles which might be suspended in a fluid whose temperature is being measured and the resultant coating-over of a part or all of the bulb, it is desirable that the base of the bulb be flush with the wall 10 of whatever container the bulb is mounted in. It is evident that having provided means for adjusting the thermo-sensitive element relative to the plate 13 as by jam nut 30 and by making the plate 13 adjustable relative to the container in which the bulb is to be mounted as by studs 14 and nuts 15 it is possible to adjust the longitudinal position of the thermometer bulb as desired.

The large hemispherical surface of the bulb provides means that will respond quickly to changes in temperature. The stream-lined effect achieved by the continuously curved surface exposed to the fluid to be measured will offer the least possible resistance to the flow of fluid or the circulation thereof. A thermo-sensitive element of this design presents a short stubby axis which reduces the lever arm projecting into a container and thus minimizes the torque which heavy viscous fluids or fluids containing heavy solid masses can exert upon a means introduced in a container for measuring purpose. This important feature of the invention makes it possible to use thermometer bulbs for industrial applications where it was impossible or very expensive to do so before. The non-heat conducting qualities of suitable resilient materials, such for instance as Neoprene, prevents the direct conduction of heat between the container wall and the thermo-sensitive element so that the thermo-sensitive element is responsive only to the temperature of the fluid which is being measured. The damage suffered by thermo-sensitive elements of the prior art due to being struck by heavy particles suspended in a fluid whose temperature was being measured, is in a large measure eliminated by the shock-absorbing qualities of the resilient mounting and the added strength which constant curvature gives to the bulb wall.

While in accordance with the provisions of the statutes, we have illustrated and described the best form of this invention now known to us, it will be apparent to those skilled in the art that changes may be made in the form of the apparatus disclosed without departing from the spirit of this invention as set forth in the appended claims, and that in some cases certain features of this invention may sometime be used to advantage without a corresponding use of other features.

Having now described this invention, what we claim as new and desire to secure by Letters Patent is:

1. In combination, a thermo-sensitive element comprising, a member, a substantially hemispherical wall sealed to said member so as to form a chamber therebetween, a thermo-sensitive fluid contained in said chamber and changeable in pressure in accordance with the temperature of said wall, means communicating with said chamber for transmitting the pressure in said chamber to a pressure responsive device, a container, and adjustable means for mounting said thermo-sensitive element in said container so that only the substantially hemispherical wall extends into said container, said adjustable means including locating means cooperating with the container whereby said element may always be located in the same position in the container.

2. In combination, a temperature responsive element comprising a body having a shank portion and a flange, a substantially hemispherical wall sealed to said flange so as to form a chamber therebetween, a thermo-sensitive fluid contained within said chamber and changeable in pressure in accordance with the temperature of said wall, a capillary tube entering through said shank for communicating the pressure in said chamber to a pressure responsive device, a part on said shank, a resilient member received by said shank between said flange and part, a container, said container having an opening to receive said resilient member, adjustable means to attach said part to said container and means adjustable along said shank to move said flange toward said part so as to press said resilient member into engagement with the sides of the opening in said container.

3. In combination, a temperature responsive element comprising a body having a shank portion and a flange, a substantially hemispherical wall sealed to said flange so as to form a chamber therebetween, a thermo-sensitive fluid contained within said chamber and changeable in pressure in accordance with the temperature of said wall, a capillary tube entering through said shank for communicating the pressure in said chamber to a pressure responsive device, a container, said container having an oversize opening to receive said element, a protective member slightly smaller than said opening to prevent the conduction of heat between said element and said container, a resilient member and a part on said shank, said protective member adapted to lie between said flange and said resilient member free of any contact with said container and both the protective and resilient members located between said flange and said part, adjustable means to attach said part to said container and means adjustable along said shank to move said flange toward said part to press said resilient member into engagement with the sides of the opening in said container.

4. A thermometer bulb assembly to be used in taking the temperature of a container that is provided with an opening through which the bulb may be inserted comprising a plate having an opening therein smaller than the opening in said container, means to rigidly fasten said plate to said container with the opening of the plate centered with respect to the opening of the container, a thermometer bulb having a flat surface thereon smaller than the opening in the container, a shank extending from said flat surface and adapted to be received in the opening in said plate, a disc surrounding said shank and an annular expansible member also surrounding said shank and located between said disc and said plate, and means on said shank beyond said plate to draw said bulb toward said plate and thereby expand said expansible member into engagement with the sides of the opening in said container.

5. A thermometer bulb assembly to be used in taking the temperature of a container that is provided with an opening through which said bulb may be inserted comprising a part fastened to said container and surrounding the opening therein, said part being formed with a countersunk portion on its surface away from the container, an expansible member slightly smaller than said opening to be received therein and being provided with a flange adapted to lie in said countersunk portion, a thermometer bulb having a flat surface thereon projecting into the container, said bulb also having a shank thereon projecting through said expansible member, a plate adapted to lie against the expansible member and the flange formed thereon, said plate being formed with an opening through which said shank extends, and means cooperating with said shank to draw the flat surface of said bulb and said plate together to thereby expand said expansible member tightly into engagement with the sides of the opening in said container, and to compress the flange on said expansible member between said part and plate.

6. A thermometer bulb assembly adapted to be placed in an opening in a container whose temperature is to be measured comprising a thermometer bulb that is substantially hemispherical in shape, a shank projecting from the flat surface of said bulb, said shank receiving in the order named an annular disc, slightly smaller in diameter than the opening in said container, an expansible member of a size to fit in said opening and having a flange thereon larger in size than said opening, a part larger than said flange and a drawing and holding member, said assembly being inserted in said opening with said disc substantially flush with the inner end of said opening and said flange lying against the container at the outer end of the opening, said drawing and holding means operating on said shank to pull said bulb toward said plate and thereby expand said expansible member into snug engagement with the sides of opening and means to attach said part to the container to draw said flange snugly into engagement therewith.

JOHN G. BOOTH.
LOUIS GESS.